(Model.)

3 Sheets—Sheet 1

E. P. HANN & G. W. DECKER.
Bolting Reel.

No. 233,411.  Patented Oct. 19, 1880.

Attest;
J. Walter Fowler
W. Blackstock

Inventor;
Edmund P. Hann
George W. Decker
By L. Hill
Their Atty (Model.) 3 Sheets—Sheet 2.

E. P. HANN & G. W. DECKER.
Bolting Reel.

No. 233,411. Patented Oct. 19, 1880.

Attest:
T. Walter Fowler,
W. Blackstock.

Inventor:
Edmund P. Hann
& George W. Decker
By L. Hill,
Their Atty.

(Model.) 3 Sheets—Sheet 3.

E. P. HANN & G. W. DECKER.
Bolting Reel.

No. 233,411. Patented Oct. 19, 1880.

Attest,
W. H. N. Knight,
W. Blackstock.

Inventor,
Edmund P. Hann
& George W. Decker
By L. Hill
Their Atty.

UNITED STATES PATENT OFFICE.

EDMUND P. HANN AND GEORGE W. DECKER, OF GEORGETOWN, D. C.

BOLTING-REEL.

SPECIFICATION forming part of Letters Patent No. 233,411, dated October 19, 1880.

Application filed March 4, 1880. (Model.)

*To all whom it may concern:*

Be it known that we, GEORGE W. DECKER and EDMUND P. HANN, both of Georgetown, in the District of Columbia, have invented certain new and useful Improvements in Bolting-Reels, Bolting-Screens, &c.; and we do hereby declare the following to be a full, clear, and exact description of the same, reference being had to the accompanying drawings, forming part of this specification, in which—

Figure 1:
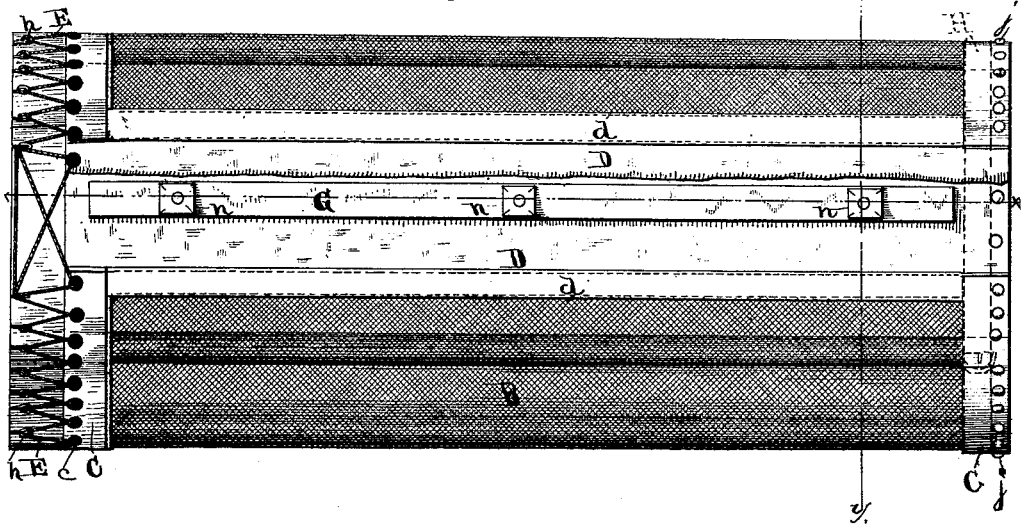
Figure 2:
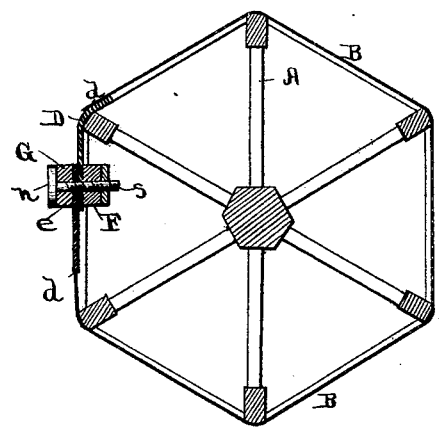
Figure 3:
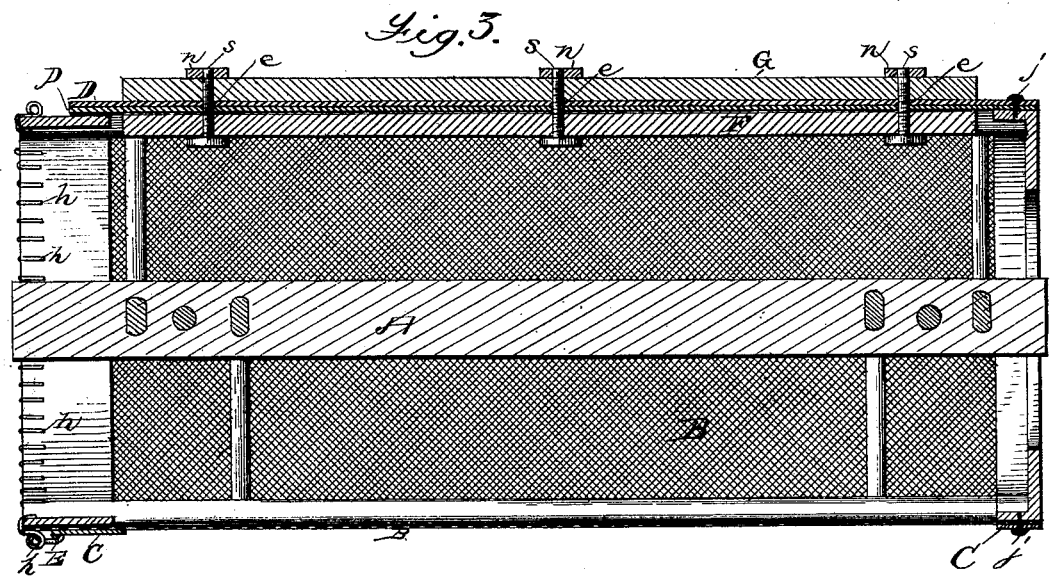
Figure 4:
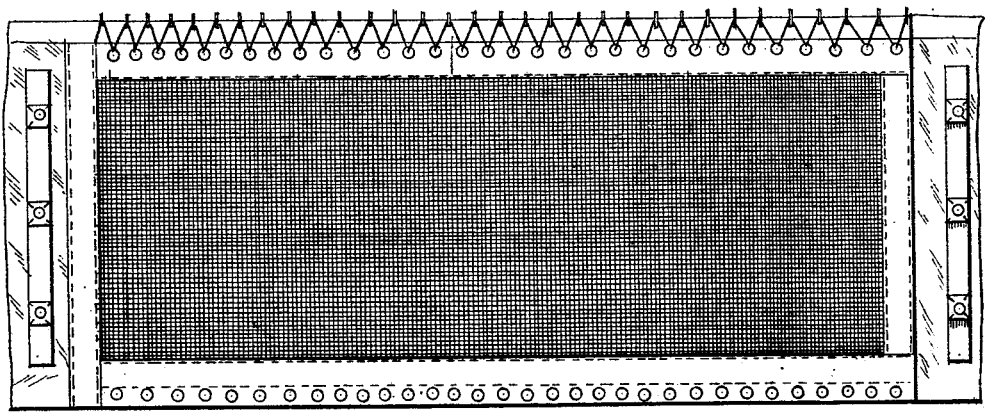
Figure 5:
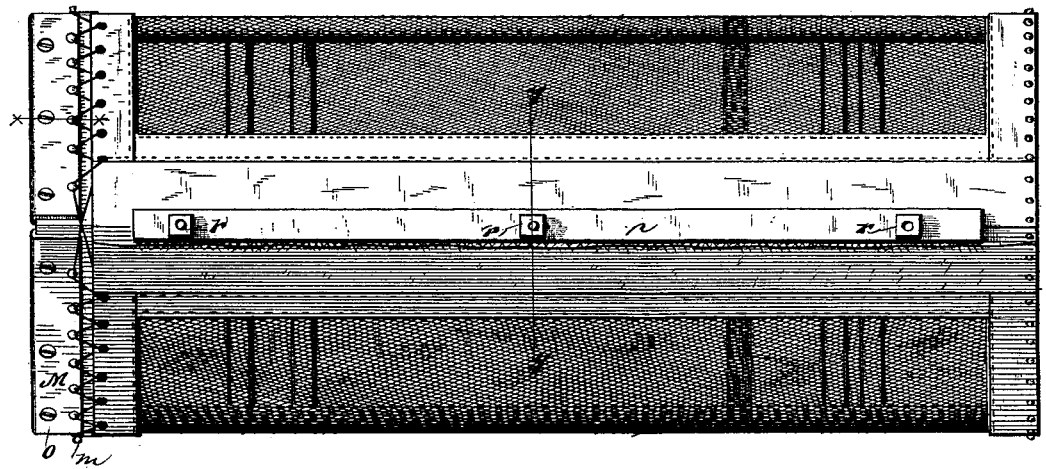
Figure 6:
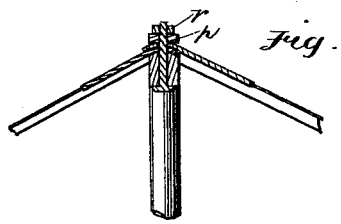

Figure 1 represents a bolting-reel with the bolting-cloth applied to it in accordance with our invention; Fig. 2, a cross-sectional view taken on the line $y\,y$, Fig. 1; Fig. 3, a longitudinal sectional view taken in the line $x\,x$, Fig. 1. Fig. 4 shows the application of our invention to a flat bolting-screen. Fig. 5 shows the bolting-cloth secured to the tail of the reel by lacings and rigid button-plates, instead of by lacings and independent hooks, as in Figs. 1 and 3. Fig. 6 is a sectional view taken on the line $y\,y$, Fig. 5, showing a modified mode of securing the ends of the cloth to one of the ribs of the reel; and Fig. 7, a cross-sectional view of the button-plate.

Similar letters of reference in the several figures denote the same parts.

Our invention has for its object to improve the construction of bolting-reels, bolting-screens, &c.; and it consists in the peculiar construction of the means for effecting the adjustments of the cloth and the various combinations of parts, which we will now proceed to describe.

In the accompanying drawings, A represents the frame of a common bolting-reel, provided with a bolting-cloth, constructed and applied in accordance with our invention.

The manner of constructing our improved cloth is as follows: We take a piece of ordinary bolting-cloth, B, and secure to its edges, by sewing or otherwise, strips of leather C or other strong flexible material. These strips are provided near their outer edges with a series of eyeleted holes, $c$, located at suitable distances apart, said series extending the entire length of the strips. The outer edges, $d$ $d$, of the bolting-cloth B and the ends of the strips C are then attached, by sewing or otherwise, to strips D of flexible material, preferably rubber, having eyeleted holes $e$ placed oppositely at corresponding distances apart.

A lacing, E, is then alternately laced through the eyeleted holes in the strip which is to come next the tail of the reel, and through loops in the shanks of the small hooks $h$. A number of headed pins or hooks, $j$, are driven around the head of the reel at the proper distance apart, and the cloth is ready for application. It is first passed around the reel, the pins in the head caused to engage with the holes in the strip C, and the hooks $h$ fitted over the edge of the reel-frame at the tail, as shown. A longitudinal bar, F, is then placed under one of the rubber strips D, and screw-bolts $s$ passed up through the bar and through the eyeleted holes $e$ in the rubber strip, after which the other rubber strip is stretched, so that its eyeleted holes may also be made to engage with the screw-bolts $s$. This being done, another perforated longitudinal bar, G, is placed upon the bolts over the overlapped rubber strips, and nuts $u$ are applied to the bolts to bind the parts firmly together and complete the joint. A strap, H, is preferably placed over the strip C next the head of the reel, as shown in Fig. 1, to securely hold the pin or hooks in engagement with the eyeleted holes.

It will be observed that in the application of the bolting-cloth to the reel in the manner described it is not necessary to disturb any portion of the reel. The same is true in regard to the removal of the cloth. The stretching of the rubber strips required to overlap them and connect them to the bolts $s$ draws the bolting-cloth tightly around the reel and holds it under constant tension. To strain the cloth in the direction of the length of the reel it is only necessary to draw more tightly the lacing E.

The strips C are intended to be wide enough to enable the cloth to be applied to reels of varying length. Where the reel is longer than usual the lacings are let out, and where shorter they are drawn up. Two or more rows of eyeleted holes may be made in the strips to increase the adjustment. The elastic rubber strips D are also preferably provided with two or more series of holes, so as to permit of an increased adjustment of the cloth transversely of the reel.

We do not consider our invention as limited to a detachable bolting-cloth provided with the special means of attachment herein shown and described, but regard it as including such a cloth provided with any means constituting a part of the removable cloth that will accomplish the object in substantially the manner indicated.

It is our purpose to make and sell the removable cloth, with its attachments, as a complete article for the trade, so that a miller can purchase a cloth of any desired grade or degree of fineness and apply it himself to any of the ordinary reels in use in his mill without altering or changing the construction of the reels.

It is well known that the condition of the atmosphere affects the operation of bolting-cloth, and that the same bolting-reel will perform better work at some times than at others. It has been impracticable to change the cloth to suit these atmospheric changes by reason of the difficulty and great loss of time required to effect the change, parts of the reel-frame having to be removed and replaced, &c. Now, however, a miller provided with a number of bolting-cloths of different degrees of fineness, constructed in accordance with our invention, can easily and quickly take off one cloth and substitute another to correspond with the state of the atmosphere, or for the purpose of furnishing a cloth adapted to the kind or quality of the grain operated upon or the results to be produced.

Our improved bolting-cloth is applicable to flat screens, such as are used in purifiers, &c., as shown in Fig. 4.

Figure 7:

In Figs. 5 and 7 we have shown a modified form of the means for securing the bolting-cloth to the tail of the reel. Instead of employing small independent hooks $h$ in connection with the lacings, as in Figs. 1 and 3, metal plates M, having buttons or hooks $m$ on their top surfaces and firmly secured to the tail of the reel by means of a flange, $n$, and screws $o$, may be employed. To remove or apply the cloth from a reel thus provided it is only necessary to fasten or unfasten the lacings from the buttons $m$—an operation easily and quickly done.

Perhaps a simpler mode of effecting a joint between the ends of the bolting-cloth than that shown in Figs. 2 and 3 is illustrated in Fig. 6, where screw-bolts are passed through one of the ribs of the reel itself, and the rubber strips on the ends of the cloth overlapped and secured by means of a longitudinal bar, $p$, and nuts $r\ r$.

We claim as our invention—

1. A bolting-cloth, B, having the perforated flexible strips C C secured to its edges, and provided with the lacing E and hooks $h$, or their equivalents, for securing the cloth to the reel and adjusting the tension of the same longitudinally of the reel, substantially as described.

2. A bolting-cloth, B, having the elastic rubber strips D D secured to its ends, in combination with means for fastening the said elastic strips together, substantially as described.

3. The bolting-cloth B, having the elastic rubber strips D D secured to its ends, in combination with the longitudinal bars and the bolts and nuts, substantially as described.

4. The bolting-cloth B, having the flexible perforated strips C C and elastic strips D D, and provided with means by which it can be secured to and removed from the reel.

5. The bolting-cloth B, having the flexible perforated strips C C and the elastic strips D D, in combination with the lacing E, hooks $h$, and the means for uniting the elastic strips, substantially as described.

6. The combination of the bolting-cloth B, having the flexible perforated strips C C and the elastic strips D D, with the lacing E, hooks $h$, means for joining the elastic strips together, and with the reel A, provided with the pins or hooks around its head, substantially as described.

EDMUND P. HANN.
GEORGE W. DECKER.

Witnesses:
W. BLACKSTOCK,
SAMUEL H. LUNT.